(12) United States Patent
Ding

(10) Patent No.: US 9,409,678 B2
(45) Date of Patent: Aug. 9, 2016

(54) MAGNETIC BOTTLE AND SUBSTRATE DISPENSING ASSEMBLY

(75) Inventor: Lv Ding, Zhejiang (CN)

(73) Assignee: NINGBO CHEFSHERE KITCHEN TECHNOLOGY CO., LTD., Zhejiang (CN)

( * ) Notice: Subject to any disclaimer, the term of this patent is extended or adjusted under 35 U.S.C. 154(b) by 260 days.

(21) Appl. No.: 13/984,434

(22) PCT Filed: Feb. 29, 2012

(86) PCT No.: PCT/CN2012/000257
§ 371 (c)(1),
(2), (4) Date: Oct. 23, 2013

(87) PCT Pub. No.: WO2013/044576
PCT Pub. Date: Apr. 4, 2013

(65) Prior Publication Data
US 2014/0209555 A1 Jul. 31, 2014

(30) Foreign Application Priority Data

Sep. 30, 2011 (CN) .......................... 2011 2 0372679

(51) Int. Cl.
*B65D 88/46* (2006.01)
*B65D 23/12* (2006.01)
(Continued)

(52) U.S. Cl.
CPC ............. *B65D 23/0885* (2013.01); *A47J 47/02* (2013.01); *A47J 47/16* (2013.01); *B65D 47/283* (2013.01); *B65D 2313/04* (2013.01)

(58) Field of Classification Search
CPC .............. Y10S 206/818; Y10S 211/01; Y10S 224/926; A47G 19/2272; B65D 2313/04

USPC .......... 206/350, 378, 709, 818; 215/2, 3, 5, 6, 215/10, 228, 229, 386, 390, 391; 220/8, 220/23.83, 23.86–23.91, 223, 230, 220/260–262, 281, 380, 483, 506, 523, 220/527–529, 536, 603, 630, 720–722, 729, 220/737–743; 248/206.5, 309.4, 311.2, 248/346.11, 537, 683
See application file for complete search history.

(56) References Cited

U.S. PATENT DOCUMENTS 2,672,257 A * 3/1954 Simmonds ..................... 220/230
3,642,122 A * 2/1972 Von Ende ..................... 224/562
(Continued)

FOREIGN PATENT DOCUMENTS

CA 2639671 A1 3/2010
CN 201046077 Y 4/2008

OTHER PUBLICATIONS

International Search Report for PCT/CN2012/000257 July 5, 2012.

*Primary Examiner* — Anthony Stashick
*Assistant Examiner* — Ned A Walker
(74) *Attorney, Agent, or Firm* — Pearne & Gordon LLP

(57) ABSTRACT

A bottle body structure includes a substrate accommodating a container bottle which includes an inner bottle body, an outer container bottle and a bottle cap. The bottle cap can be accommodated inside the outer bottle body and the side wall of the bottle cap is provided with a discharge hole. An ejecting mechanism, enabling the inner bottle body to displace axially relative to the outer bottle body to expose the discharge hole out of the outer bottle body, is provided between the inner bottle body and the substrate. As a result, the bottle body structure conceals the discharge hole in the outer bottle body and the ejecting mechanism enables the inner bottle body to eject automatically to expose the discharge hole, which is convenient to use and hygienic. Material in the bottle can be poured out easily with one hand. The bottle body is especially applicable to storage of spices.

8 Claims, 3 Drawing Sheets

(51) Int. Cl.
    *B65D 5/68*         (2006.01)
    *B65D 23/08*       (2006.01)
    *A47J 47/02*       (2006.01)
    *B65D 47/28*       (2006.01)
    *A47J 47/16*       (2006.01)

(56) References Cited

U.S. PATENT DOCUMENTS

| | | | | |
|---|---|---|---|---|
| 3,961,721 | A * | 6/1976 | Gordon et al. | 220/230 |
| 4,337,860 | A * | 7/1982 | Carrigan | 206/376 |
| 5,176,269 | A * | 1/1993 | Herman | 215/228 |
| 5,186,350 | A * | 2/1993 | McBride | 220/739 |
| 5,624,410 | A * | 4/1997 | Tsukada et al. | 604/256 |
| 5,625,347 | A * | 4/1997 | MacLean et al. | 340/568.1 |
| 5,660,276 | A * | 8/1997 | Winnard | 206/350 |
| 6,318,569 | B1 * | 11/2001 | Rothing | 211/90.01 |
| 6,390,319 | B1 * | 5/2002 | Yu | 220/230 |
| D468,162 | S * | 1/2003 | Martin | D7/592 |
| 7,007,818 | B2 * | 3/2006 | Martin | 220/23.4 |
| 7,743,934 | B2 * | 6/2010 | Martin | 220/23.4 |
| 8,528,775 | B2 * | 9/2013 | Martin | 220/630 |
| 8,556,095 | B1 * | 10/2013 | Yamaguchi | 215/228 |
| 2003/0189494 | A1 * | 10/2003 | Lin | 340/686.1 |
| 2004/0108285 | A1 * | 6/2004 | Martin | 211/71.01 |
| 2006/0138134 | A1 | 6/2006 | Martin | |
| 2006/0226157 | A1 * | 10/2006 | Martin | 220/630 |
| 2012/0223044 | A1 * | 9/2012 | Scott et al. | 215/44 |

* cited by examiner

MAGNETIC BOTTLE AND SUBSTRATE DISPENSING ASSEMBLY

This application is a National Stage application of PCT international application PCT/CN2012/000257, filed on Feb. 29, 2012 which claims the priority of Chinese Patent Application No. 201120372679.9 entitled "BOTTLE BODY STRUCTURE", filed with the Chinese Patent Office on Sep. 30, 2011, both of which are incorporated herein by reference in their entirety.

TECHNICAL FIELD OF THE INVENTION

The present invention relates to a container bottle, in particular referring to a bottle body structure especially applicable to storage of spices.

BACKGROUND OF THE INVENTION

With the improvement of living standards, people demand commodities which are more hygienic with higher quality and performance, and application hygiene is important especially for kitchen utensils.

Existing spice containers generally comprise a bottle body for containing a spice and a bottle cap covered on the mouth of the bottle body. In use, the bottle cap is opened to pour out the spice contained in the bottle body. After use, the bottle cap is covered on the mouth of the bottle body again. When the bottle cap of such existing spice containers is opened or covered by hands, foods carried are easy to fall into the bottle body from the mouth of thereof, which not only contaminates the material in the bottle, but also shortens the storage life of the spice which will be expired and deteriorated too early due to various mixed substances. At the same time, structures of such spice containers are very inconvenient to use, and the spice in the bottle body can be hardly poured out skillfully especially when a spice container is used by one hand while the other hand is performing another cooking action.

In order to arrange kitchen utensils orderly, more and more spice containers are manufactured and used in a matched manner currently. These matched spice containers generally comprise a plurality of container bottles and a tray enabling to arrange these container bottles orderly. However, existing trays, which only functions to accommodate the container bottles, lack functional characteristics.

SUMMARY OF THE INVENTION

The technical problem to be solved by the present invention is to provide a bottle body structure which is hygienic to use, convenient to operate and used in a matched manner according to the present situation of the prior art.

A technical solution applied by the present invention to solve the technical problem above is that: the bottle body structure comprises a container bottle and a substrate accommodating the container bottle, wherein the container bottle comprises an inner bottle body for containing a material, an outer bottle body sleeved outside the inner bottle body and capable of displacing axially relative to the inner bottle body, and a bottle cap detachably covered on the mouth of the inner bottle body. The bottle cap can be accommodated inside the outer bottle body and the side wall of the bottle cap is provided with a discharge hole. An ejecting mechanism enabling the inner bottle body to displace axially relative to the outer bottle body to expose the discharge hole out of the outer bottle body is provided between the inner bottle body and the substrate.

Preferably, a magnetic member is provided on the substrate. A first magnetic member having mutual attraction with the magnetic member on the substrate is provided on the outer bottom surface of the inner bottle body, and a resetting mechanism enabling the inner bottle body to displace axially relative to the outer bottle body to expose the discharge hole out of the outer bottle body is further provided between the outer bottle body and the inner bottle body.

The resetting mechanism may be an elastic component provided between the bottom surfaces of the inner bottle body and the outer bottle body. Preferably, the resetting mechanism is a second magnetic member provided on the inner wall surface of the outer bottle body and having mutual repulsion with the first magnetic member.

As an improvement for each solution above, the inner bottle body comprises a foundation and a casing provided on the foundation. A window convenient for observing the stock of the material in the inner bottle body is provided on the peripheral wall of the foundation.

Preferably, a guide groove and a guide block accommodated in the guide groove are provided on the inner peripheral wall of the casing and the outer peripheral wall of the inner bottle body, respectively.

Preferably, there is a plurality of discharge holes, and such a structure is more applicable to storage of powdery materials.

Preferably, there may be a plurality of container bottles.

Compared with the prior art, the present invention conceals the discharge hole in the outer bottle body and the ejecting mechanism enabling the inner bottle body to eject automatically to expose the discharge hole is provided between the container bottle and the substrate, which is not only convenient to use, but also hygienic. The material in the bottle can be poured out easily with even one hand. The bottle body of the present invention is especially applicable to storage of spices.

DETAILED DESCRIPTION OF THE INVENTION

The present invention will be described in details below in combination with the accompanying drawings and embodiments.

Figure 1:
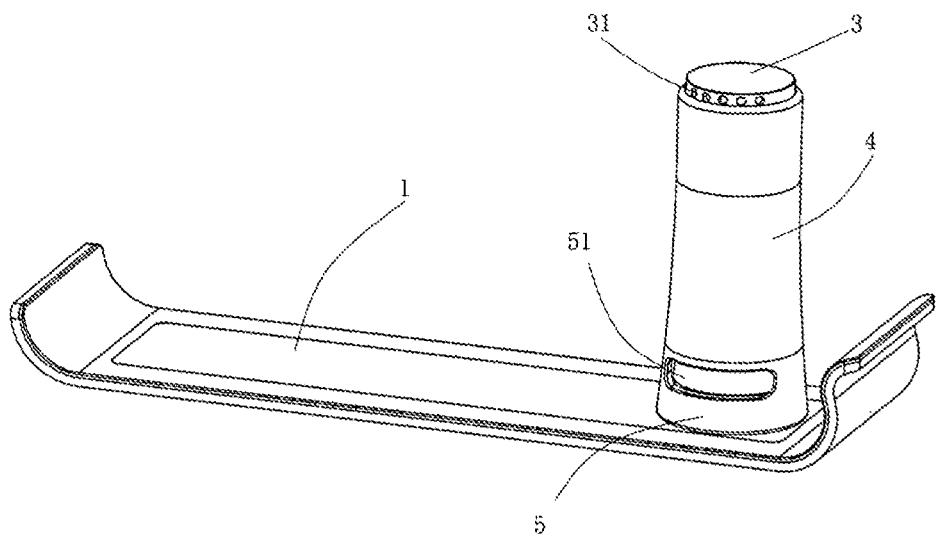
FIG. 1 is a three-dimensional view of an assembly structure of an embodiment of the present invention.
Figure 2:
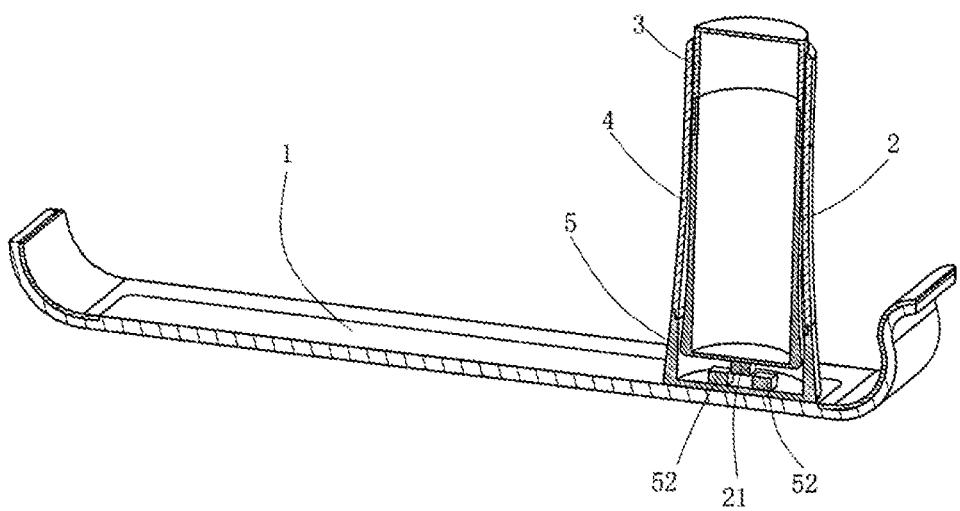
FIG. 2 is a longitudinal sectional view of FIG. 1 taken along section line II-II.
Figure 3:
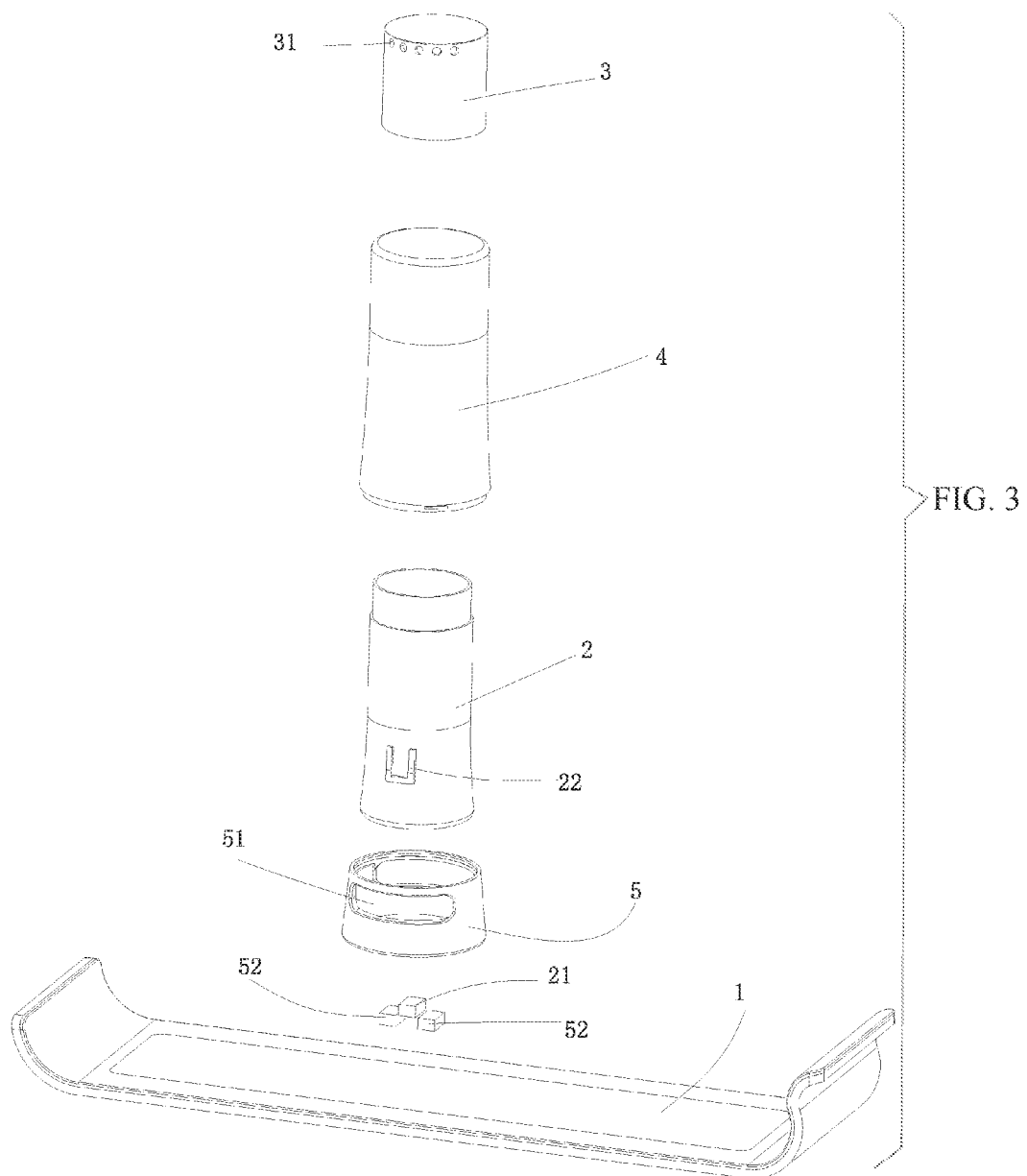
FIG. 3 is a three-dimensional exploded view of an embodiment of the present invention.
Figure 4:
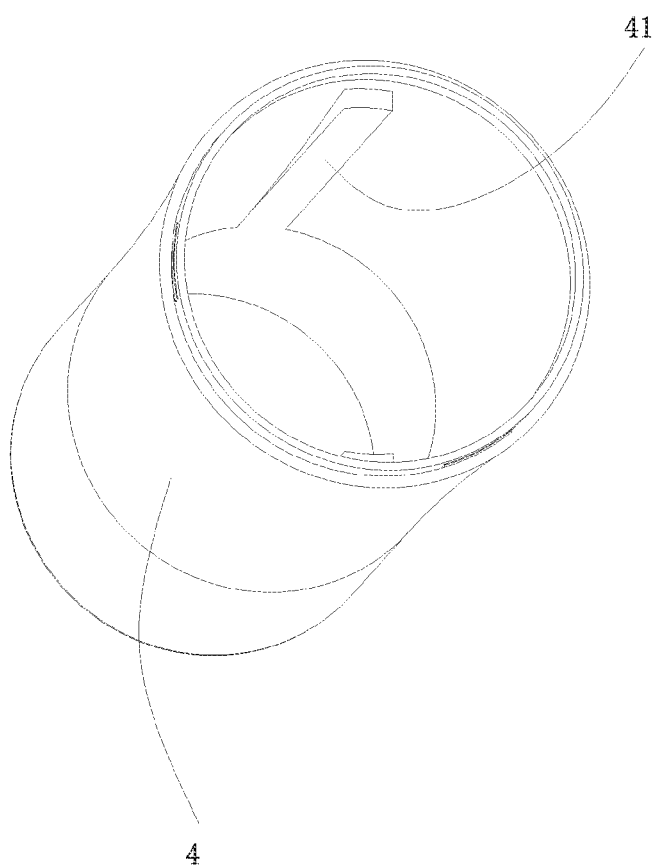
FIG. 4 is a schematic diagram of a stereo-structure of a casing in an embodiment of the present invention.

As shown in FIG. 1 to FIG. 4, the bottle body structure comprises:

a substrate 1 for accommodating container bottles and magnetic members (not shown in the figures) corresponding to the container bottles are provided in the substrate 1;

an inner bottle body 2 for containing a material. The inner bottle body is used for containing a powdery spice in the present embodiment. The inner bottle body 2 is made of a transparent material so that the stock of the spice in the inner bottle body can be observed conveniently. A first magnetic member 21 having mutual attraction with the magnetic members on the substrate 1 is provided on the outer bottom surface of the inner bottle body 2. A "U"-shaped guide groove 22 is provided on the outer peripheral wall of the bottle body 2;

a bottle cap 3 detachably covered on the mouth of the inner bottle body, and a plurality of discharge holes 31 are provided at intervals on the peripheral wall of the bottle cap 3;

a casing 4 sleeved out side the inner bottle body 2 and the bottle cap 3, and a guide block 41 accommodated in the guide groove 22 is provided on the inner peripheral wall of the casing 4;

a foundation 5 connected with the casing 5 to form an outer bottle body of the present embodiment, and the longitudinal section of the foundation 5 presents a roughly "U" shape. A window 51 is provided on the peripheral wall of the foundation 5. A second magnetic member 52, i.e. a resetting mechanism of the present embodiment is provided on the inner bottom surface of the foundation 5. There are two magnetic members 52 set at the two sides of the first magnetic member 21, respectively.

The magnetic member on the substrate 1, the first magnetic member 21 and the second magnetic members 52 form an ejecting mechanism of the present embodiment.

The inner bottle body 2, the bottle cap 3, the casing 4 and the foundation 5 form a container bottle of the present embodiment. Only one container body is shown by the bottle body structure of the present embodiment. In practical use, there may be one or more container bottles, and the length of the substrate 1 may be determined specifically according to the number of the container bottles.

When there is no need to pour the spice, the container bottle is placed on the substrate 1. At the moment, the inner bottle body 2 is attracted by the first magnetic member 21 and the magnetic members on the substrate 1 to move downwards to conceal the bottle cap 3 in the casing 4, and the discharge hole 31 is sealed automatically. When the container bottle is taken from the substrate 1, the inner bottle body 21 is moved upwards automatically by the mutual repulsion between the first magnetic member 21 and the second magnetic members 52 to expose the discharge hole 31 out of the casing 4. At the moment, the spice in the inner bottle body can be poured out by toppling the containing bottle, which is very convenient to operate and hygienic to use. At the same time, the acting force among the magnetic members can be fully converted into the axial displacement of the inner bottle body under the action of the guide groove 22 and the guide block 41.

The invention claimed is:
1. A dispensing system comprising:
a substrate (1) providing a magnetic member;
a bottle assembly comprising:
   an inner bottle body (2) for containing a material and comprising:
      a peripheral sidewall having an exterior guide groove (22);
      a closed base having an outer bottom surface with a first magnet (21) magnetically attracting the magnetic member of the substrate;
      an open mouth;
      a cap (3) with discharge holes removably covering said open mouth;
   an outer bottle body encasing the inner bottle body and comprising:
      a sleeve (4) telescoping the peripheral sidewall and having:
         an interior guide block (41) seated within the guide groove;
         an open bottom end; and,
      a base (5) removably connected to the open bottom end and having:
         an exterior bottom surface disposed upon the substrate;
         an interior bottom surface with second magnets (52) disposed between the outer bottle body and the inner bottle body, the second magnets magnetically repelling the first magnet; and,
         a sidewall with a window (51) for observing the material;
an ejecting mechanism existing between the inner bottle body and the outer bottle body, the ejecting mechanism derived from the mutual magnetic repulsion force proximally generated amongst the first magnet and the second magnets, wherein removing the bottle assembly from the substrate automatically causes the inner bottle body to displace axially away from the outer bottle body and telescope outward to uncover the discharge holes from the sleeve for dispensing the material; and,
a resetting mechanism existing between the inner bottle body and the substrate, the resetting mechanism derived from the mutual magnetic attraction force proximally generated between the first magnet and the magnetic member, wherein placing the bottle assembly upon the substrate automatically causes the inner bottle body to displace axially toward the outer bottle body and telescope inward to seal the discharge holes within the sleeve for hygienically storing the material.

2. The dispensing system according to claim 1, wherein the guide groove is u-shaped and the window is elongate.

3. The dispensing system according to claim 1, wherein the second magnets are a pair of magnetic members.

4. The dispensing system according to claim 1, the resetting mechanism further comprising an elastic component between the outer bottom surface of the inner bottle body and the base of the outer bottle body.

5. The dispensing system according to claim 1, wherein the peripheral sidewall of the inner bottle body is transparent for observing the material.

6. The dispensing system according to claim 1, wherein bottle assembly is a kitchen utensil comprising a powdery spice for cooking.

7. The dispensing system according to claim 1, further comprising a plurality of bottle assemblies, wherein the substrate provides a plurality of magnetic members for the plurality of bottle assemblies.

8. The dispensing system according to claim 7, wherein the substrate is a tray having a length accommodating the plurality of bottle assemblies.

* * * * *